Patented Oct. 7, 1924.

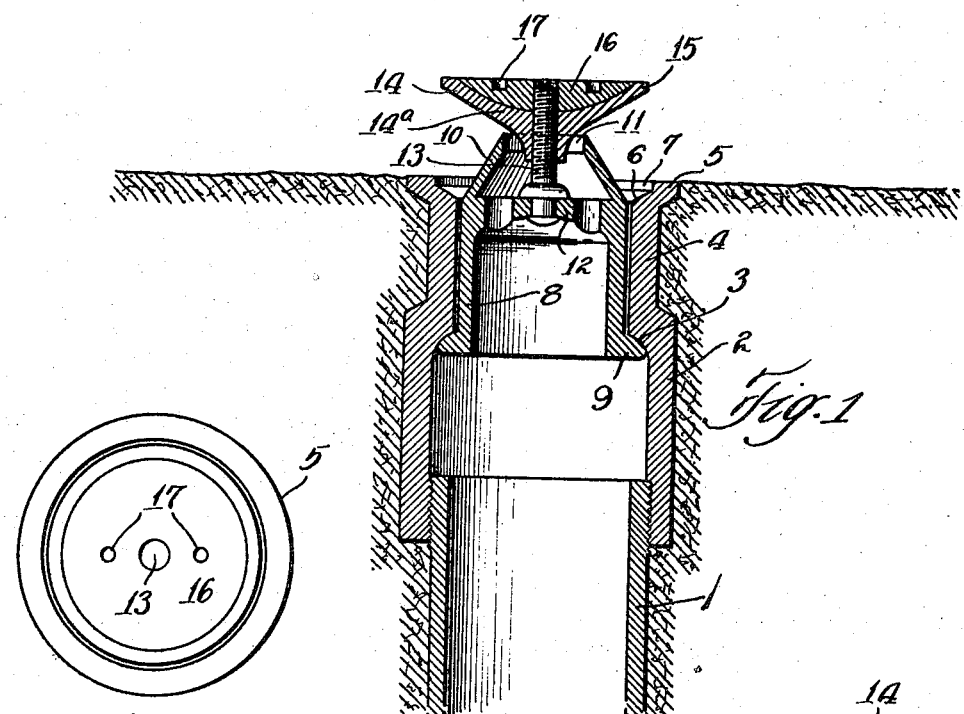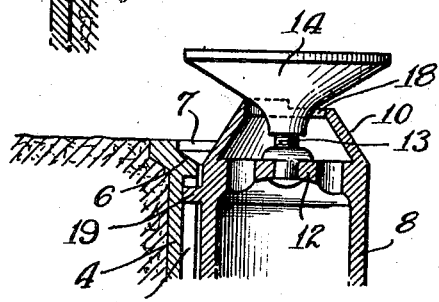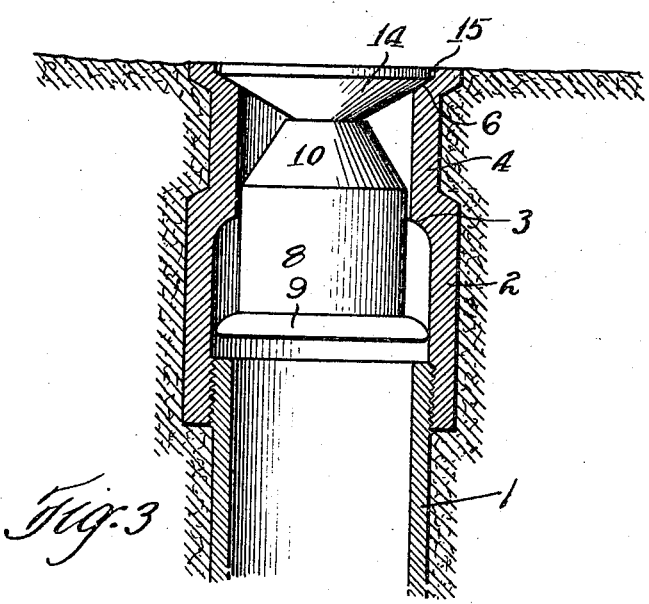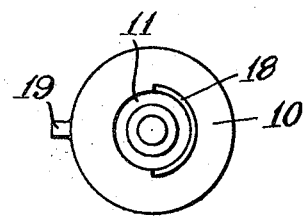

1,510,930

UNITED STATES PATENT OFFICE.

HOWARD H. ENELL, OF EAST CLEVELAND, OHIO.

SPRINKLING DEVICE.

Application filed March 25, 1922. Serial No. 546,570.

*To all whom it may concern:*

Be it known that I, HOWARD H. ENELL, a citizen of the United States, residing at East Cleveland, in the county of Cuyahoga and State of Ohio, have invented a certain new and useful Improvement in Sprinkling Devices, of which the following is a full, clear, and exact description, reference being had to the accompanying drawings.

This invention relates to devices for sprinkling or irrigating lawns, and has for its general object to provide a device of this kind which is efficient in operation for the purpose of sprinkling an approximately circular area or any desired sector thereof; which is simple of construction and inexpensive of production; and one wherein the working parts of the device will, when not operating, be located below the surface of the lawn in which the device is installed, whereby it will be out of the path of the lawn mowers or other devices used for working or trimming the lawn. I accomplish the foregoing objects in and through the construction and arrangement of parts shown in the drawing forming part hereof, wherein Fig. 1 represents a central vertical sectional view through a supply pipe and a sprinkling or irrigating device applied to such pipe and constructed in accordance with my invention, the parts being shown in operating position; Fig. 2 a plan view of the device shown in Fig. 1; Fig. 3 a sectional elevation of the device shown in the preceding views, the parts being shown in non-operative position; Fig. 4 a detail in section showing my device as constructed and arranged for sprinkling a sector of a lawn; and Fig. 5 a detail in plan of the device shown in Fig. 4.

Describing the various parts by reference characters, and with particular reference to the form of my invention shown in Figs. 1–3 inclusive, 1 represents a stand pipe receiving water from any convenient source of supply, as, for instance, a pipe (not shown) connected with a main. The upper end of the pipe 1 is externally threaded and has threaded thereon a housing 2. This housing is provided between the top and bottom thereof with an inwardly extending shoulder 3, the upper portion 4 above such shoulder being preferably cylindrical, the extreme upper end of the housing being flared outwardly, as shown at 5, and having within the upper end thereof a seat comprising an upwardly and outwardly inclined portion 6 and a vertical cylindrical portion 7.

Reciprocably mounted within the housing is a distributing device comprising a plunger having a valve-controlled outlet, with a valve cooperating with such outlet to regulate the shape and volume of the sheet or spray of water discharged therethrough. The plunger comprises a cylindrical casing 8 having an outwardly projecting flange 9 at its bottom adapted to contact with the shoulder 3, when the said body is elevated, and thus prevent the passage of water around the said shoulder and between the exterior of the casing 8 and the interior of the cylindrical housing 4. Above the cylindrical part 8, the hollow plunger is provided with a frusto-conical end 10 having a delivery outlet 11, preferably bounded by a vertical cylindrical wall. Extending across the upper end of the cylindrical part 8 of the plunger is a spider 12 to which is connected the lower end of a bolt 13, the upper portion of the bolt being threaded. Mounted upon the threaded portion of the bolt is a valve 14 of inverted conical shape, the upwardly flaring surface cooperating with the upper end of the outlet 11 to distribute the water supplied therebetween in an inverted conical shape. The outer edge 15 of the valve is adapted to seat within the corresponding portion 7 of the housing with the outer edge portion thereof resting upon the seat portion 6 of said housing. By adjusting the valve 14 upon the threaded stem of the bolt, the width of the opening provided for the delivery of water beneath the valve can be correspondingly varied.

For the purpose of securing the valve in any position to which it may be adjusted, a lock nut 16 is provided, the said nut being preferably of a shape to be received within the concave top $14^a$ of the valve, its upper surface being preferably horizontal. This nut is provided with a pair of holes 17 for the reception of a spanner wrench.

With the parts constructed and arranged as described, the operation will be readily understood.

When water is turned on to the stand pipe 1, as by opening the valve in the supply pipe connected thereto, it lifts the plunger from the position shown in Fig. 3 to that shown in Fig. 1, and the water will be discharged in an inverted conical spray or sheet between the top of the wall 11 and the bottom of the valve.

In Figs. 4 and 5 there are shown the form of my invention which is specially designed for the sprinkling of a sector of the circular area which is sprinkled by the construction shown in the preceding views. In these views, a portion only of the housing is shown, the housing having the flaring upper end 5 and the seat portions 6 and 7 for the valve 14, which valve is mounted in a plunger identical with that shown in the preceding views and designated by like numerals, with the exception that the upper end of the conical portion 10 of the housing is cut away, as indicated at 18, forming a downwardly extending slot through which water may be directed when the valve 14 is screwed into contact with the top of the delivery end of such portion 10. The slot shown herein is approximately 180° in extent, whereby the spray may operate upon about a half circle of lawn or other surface. By varying the width of the slot, the area of the sector sprinkled may be varied accordingly. The purpose of sprinkling only a portion of an area is to enable the device to operate adjacent to the sidewalks or in corners and other places where it may be undesirable to permit the water to be distributed in all directions from the central point. In order to ensure the localization of the irrigation or sprinkling, the plunger 8 is provided with a guide projection 19 operating in a vertical guide slot 20 in the housing 4.

Having thus described my invention, what I claim is:

1. A device of the character described comprising a housing having an outwardly flared seat in the upper end thereof and provided with a projection between the top and bottom thereof, a hollow plunger reciprocably mounted in said housing and having a projection adapted to engage the projection of said housing to limit the upward movement of said plunger, the said plunger having a central vertical outlet, a threaded stem carried by said plunger and projecting upwardly through said outlet, an outwardly flaring valve adjustably threaded on said stem cooperating with the outlet of said plunger and with said seat, and means for locking said valve in adjusted position, said means being adapted to lie flush with the top of said valve.

2. A device of the character described comprising a stand pipe, a housing mounted on said stand pipe and having an outwardly flared seat in the upper end thereof and provided with a projection between the top and bottom thereof, a hollow plunger reciprocably mounted in said housing and having a projection adapted to engage the first mentioned projection thereby to limit the upward movement of said plunger, the said plunger having a circular outlet opening in the top thereof and a spider below said opening, a stem projecting upwardly from said spider, a valve adjustably mounted on said stem and having an outwardly and upwardly outer flared portion adapted to cooperate with the said seat, said valve being provided with a recess in the top thereof and a lock nut threaded on said stem and adapted to seat in said recess and lie flush with the top of said valve.

In testimony whereof, I hereunto affix my signature.

HOWARD H. ENELL.